(12) United States Patent
Tsuno et al.

(10) Patent No.: US 10,702,923 B2
(45) Date of Patent: Jul. 7, 2020

(54) METHOD OF MANUFACTURING NI ALLOY PART

(71) Applicant: IHI Corporation, Koto-ku (JP)

(72) Inventors: Nobuyasu Tsuno, Tokyo (JP); Shuji Ikeda, Tokyo (JP)

(73) Assignee: IHI Corporation, Koto-ku (JP)

( * ) Notice: Subject to any disclaimer, the term of this patent is extended or adjusted under 35 U.S.C. 154(b) by 268 days.

(21) Appl. No.: 15/285,844

(22) Filed: Oct. 5, 2016

(65) Prior Publication Data

US 2017/0021424 A1 Jan. 26, 2017

Related U.S. Application Data

(63) Continuation of application No. PCT/JP2015/069981, filed on Jul. 13, 2015.

(30) Foreign Application Priority Data

Jul. 23, 2014 (JP) ................. 2014-149611

(51) Int. Cl.
*B22F 5/00* (2006.01)
*B22F 3/24* (2006.01)
(Continued)

(52) U.S. Cl.
CPC ............. *B22F 5/009* (2013.01); *B22F 3/02* (2013.01); *B22F 3/16* (2013.01); *B22F 3/24* (2013.01);
(Continued)

(58) Field of Classification Search
None
See application file for complete search history.

(56) References Cited

U.S. PATENT DOCUMENTS 5,047,093 A * 9/1991 Kimmerle ............... C22F 1/10
148/410
5,244,515 A * 9/1993 Miglin .................... C22F 1/10
148/675
(Continued)

FOREIGN PATENT DOCUMENTS

CN 102251131 11/2011
EP 0 402 168 A1 12/1990
(Continued)

OTHER PUBLICATIONS

Valencia JJ et al: "Microstructure and mechanical properties of Inconel 625 and 718 alloys processed by powder injection molding", Jan. 1, 1994, pp. 935-946 (Year: 1994).*
(Continued)

*Primary Examiner* — Kevin E Yoon
*Assistant Examiner* — Ryan L Heckman
(74) *Attorney, Agent, or Firm* — Oblon, McClelland, Maier & Neustadt, L.L.P.

(57) ABSTRACT

A method of manufacturing a Ni alloy part includes a solution treatment step of solution treating a sintered compact, which is obtained by sintering and molding a precipitation hardening Ni alloy powder by metal injection molding, by allowing the sintered compact to hold at a temperature of not lower than 1050° C. but not higher than 1250° C. for one hour to five hours, followed by rapidly cooling to room temperature, where the precipitation hardening Ni alloy powder, and an aging treatment step of aging-treating the solution-treated sintered compact by allowing the solution-treated sintered compact to hold at the temperature of not lower than 600° C. but not higher than 800° C., followed by cooling to room temperature.

4 Claims, 5 Drawing Sheets

(51) Int. Cl.
   *C22F 1/10* (2006.01)
   *F01D 25/00* (2006.01)
   *B22F 3/02* (2006.01)
   *F04D 29/38* (2006.01)
   *F02C 7/00* (2006.01)
   *B22F 5/04* (2006.01)
   *C22C 19/05* (2006.01)
   *B22F 3/16* (2006.01)
   *F04D 29/32* (2006.01)
   *C22F 1/00* (2006.01)

(52) U.S. Cl.
   CPC ............... *B22F 5/04* (2013.01); *C22C 19/05* (2013.01); *C22C 19/055* (2013.01); *C22C 19/056* (2013.01); *C22F 1/10* (2013.01); *F01D 25/00* (2013.01); *F02C 7/00* (2013.01); *F04D 29/324* (2013.01); *F04D 29/38* (2013.01); *B22F 2003/248* (2013.01); *B22F 2302/45* (2013.01); *B22F 2998/10* (2013.01); *C22F 1/00* (2013.01)

(56) References Cited

U.S. PATENT DOCUMENTS

| | | | |
|---|---|---|---|
| 2011/0061394 | A1 | 3/2011 | Hawk et al. |
| 2011/0308674 | A1 | 12/2011 | Imamovic et al. |
| 2012/0247626 | A1 | 10/2012 | Franchet et al. |

FOREIGN PATENT DOCUMENTS

| | | |
|---|---|---|
| JP | 64-73042 | 3/1989 |
| JP | 7-331368 | 12/1995 |
| JP | 8-260083 | 10/1996 |
| JP | 9-3577 | 1/1997 |
| JP | 2003-49658 | 2/2003 |
| JP | 2011-80146 | 4/2011 |
| JP | 2011-157566 | 8/2011 |
| JP | 2011-255410 | 12/2011 |
| JP | 2013-513728 | 4/2013 |
| WO | WO 2009/054756 A1 | 4/2009 |

OTHER PUBLICATIONS

Hikaru Ikeda et al., "Fatigue failure properties of injection molded super alloy compacts", Journal of the Japan Society of Powder and Powder Metallurgy, Nov. 2011, vol. 58, No. 11, pp. 679 to 685. (Ikeda) (Year: 2011).*
Translation of Hikaru Ikeda et al., "Fatigue failure properties of injection molded super alloy compacts", Journal of the Japan Society of Powder and Powder Metallurgy, Nov. 2011, vol. 58, No. 11, pp. 679 to 685. (Ikeda), pp. 1-23, translated Aug. 2018 (Year: 2011).*
Hall, A.M et al, "Thermal and mechanical treatments for nickel and some nickel-base alloys: Effects on mechanical properties", 1972, NASA-SP-5106, p. 28-31 (Year: 1972).*
Valencia, J.j., et al. "Microstructure and Mechanical Properties of Inconel 625 and 718 Alloys Processed by Powder Injection Molding." Superalloys 718, 625, 706 and Various Derivatives (1994), 1994 (Year: 1994).*
Rao, G. Appa, et al. "Effect of Solution Treatment Temperature on Microstructure and Mechanical Properties of Hot Isostatically Pressed Superalloy Inconel* 718." Materials Science and Technology, vol. 20, No. 9, 2004, pp. 1161-1170 (Year: 2004).*
Chang, Litao, et al. "Effect of Heat Treatment on Microstructure and Mechanical Properties of the Hot-Isostatic-Pressed Inconel 718 Powder Compact." Journal of Alloys and Compounds, vol. 590, 2014, pp. 227-232 (Year: 2014).*
High-Performance Alloys for Aircraft, Land-Based & Marine Gas Turbines, Special Metals Corporation, 2019 (Year: 2019).*
Combined Office Action and Search Report dated Aug. 31, 2017 in Chinese Patent Application No. 201580038318.1 (With English translation of categories of cited documents).
Hikaru Ikeda et al. "Fatigue Failure Properties of Injection Molded Superalloy Compacts", Journal of the Japan Society of Powder and Powder Metallurgy, vol. 58, No. 11, 2011, 8 pages (with English Abstract).
Hikaru Ikeda et al. "Application of MIM Process for Nickel base Superalloy", Journal of the Japan Society of Powder and Powder Metallurgy, vol. 58, No. 1, 2011, 6 pages (with English Abstract).
J.J. Valencia et al. "Microstructure and Mechanical Properties of Inconel 625 and 718 Alloys Processed by Powder Injection Molding", Superalloys 718,625, 706 and Various Derivatives, 1994, 11 pages.

* cited by examiner

METHOD OF MANUFACTURING NI ALLOY PART

CROSS REFERENCE TO RELATED APPLICATIONS

This application is a continuation application of International Application No. PCT/JP2015/069981, filed on Jul. 13, 2015, which claims priority to Japanese Patent Application No. 2014-149611, filed on Jul. 23, 2014, the entire contents of which are incorporated by references herein.

BACKGROUND

1. Field

The present disclosure relates to a method of manufacturing a Ni alloy part, particularly a method of manufacturing a Ni alloy part sintered and molded from precipitation hardening Ni alloy powder by metal injection molding.

2. Description of the Related Art

Gas turbine parts such as a turbine blade have used a precipitation hardening Ni alloy with excellent heat resistance, because the parts need to have high temperature mechanical strength such as fatigue strength. For the purpose of enhancing the mechanical strength, the precipitation hardening Ni alloy is subjected to heat treatment including solution treatment and aging treatment.

Japanese Patent Application Publication No. 2011-80146 (Patent Literature 1) describes the production of a jet engine part and the like from a forged material of the precipitation hardening Ni alloy by solution treatment of the forged material at a temperature of approximately 871° C. to approximately 954° C., followed by aging treatment.

SUMMARY

Meanwhile, a molding method including injection-molding a mixture of metal powder and a binder, followed by sintering to obtain a final product is termed metal injection molding (MIM). Metal injection molding is a manufacturing method capable of obtaining a final shaped part having material strength comparable to that of a forged material while allowing as high shape flexibility as synthetic resin injection molding. Metal injection molding makes it possible to obtain a complicatedly-shaped product without having a complicated assembling step or the like. For this reason, the application of metal injection molding to a Ni alloy part as a jet engine part has been under consideration.

On the other hand, the forged material made from the precipitation hardening Ni alloy is given an enhanced mechanical strength by introducing strain into the forged material, and thereby micronizing the crystal grains. For this reason, the forged material is solution treated at a relatively low solution treatment temperature as shown in PTL 1 given above and the like in order to inhibit the crystal grains from coarsening through recovery, recrystallization and the like.

Meanwhile, in a case where the solution treatment used for the forged material is applied to a sintered compact molded from the precipitation hardening Ni alloy powder by metal injection molding, the solution treatment at the relatively low solution treatment temperature may cause a hard brittle δ phase (delta phase) to precipitate in grain boundaries and consequently decrease mechanical strength such as fatigue strength.

With these taken into consideration, an object of the present disclosure is to provide a method of manufacturing a Ni alloy part, which is capable of further enhancing mechanical strength characteristics of a Ni alloy part molded from precipitation hardening Ni alloy powder by metal injection molding.

A method of manufacturing a Ni alloy part according to the present disclosure includes a solution treatment step of solution treating a sintered compact, which is obtained by sintering and molding a precipitation hardening Ni alloy powder by metal injection molding, by allowing the sintered compact to hold at a temperature of not lower than 1050° C. but not higher than 1250° C. for one hour to five hours, followed by rapidly cooling to room temperature, where the precipitation hardening Ni alloy powder includes Ti of 0.65% by mass to 1.15% by mass, inclusive, Al of 0.20% by mass to 0.80% by mass, inclusive, Cr of 17.00% by mass to 21.00% by mass, inclusive, Nb of 4.75% by mass to 5.50% by mass, inclusive, Mo of 2.80% by mass to 3.30% by mass, inclusive, Ni of 50.00% by mass to 55.00% by mass, inclusive, and the balance including Fe and unavoidable impurities, and an aging treatment step of aging-treating the solution-treated sintered compact by allowing the sintered compact to hold at the temperature of not lower than 600° C. but not higher than 800° C., followed by cooling to room temperature.

In the method of manufacturing a Ni alloy part according to the present disclosure, in the solution treatment step, the sintered compact is solution treated at a temperature of not lower than 1100° C. but not higher than 1250° C.

The method of manufacturing a Ni alloy part according to the present disclosure includes an aging treatment step of aging-treating a sintered compact by allowing the sintered compact to hold at a temperature of not lower than 600° C. but not higher than 800° C., followed by cooling to room temperature, where the sintered compact is molded from a precipitation hardening Ni alloy powder by metal injection molding with sintering at a temperature of not lower than 1100° C. but not higher than 1250° C. for one hour to five hours, followed by rapidly cooling to room temperature, and where the precipitation hardening Ni alloy powder includes Ti of 0.65% by mass to 1.15% by mass, inclusive, Al of 0.20% by mass to 0.80% by mass, inclusive, Cr of 17.00% by mass to 21.00% by mass, inclusive, Nb of 4.75% by mass to 5.50% by mass, inclusive, Mo of 2.80% by mass to 3.30% by mass, inclusive, Ni of 50.00% by mass to 55.00% by mass, inclusive, and the balance including Fe and unavoidable impurities.

In the method of manufacturing a Ni alloy part according to the present disclosure, the Ni alloy part is a gas turbine part.

The foregoing configuration includes the solution treatment step of solution treating the sintered compact, which is obtained by sintering and molding the precipitation hardening Ni alloy powder by metal injection molding, by allowing the sintered compact to hold at the temperature of not lower than 1050° C. but not higher than 1250° C. for one hour to five hours, followed by rapid cooling to room temperature, where the precipitation hardening Ni alloy powder includes Ti of 0.65% by mass to 1.15% by mass, inclusive, Al of 0.20% by mass to 0.80% by mass, inclusive, Cr of 17.00% by mass to 21.00% by mass, inclusive, Nb of 4.75% by mass to 5.50% by mass, inclusive, Mo of 2.80% by mass to 3.30% by mass, inclusive, Ni of 50.00% by mass to 55.00% by mass, inclusive, and the balance including Fe and the unavoidable impurities, and the aging treatment step of aging-treating the solution-treated sintered compact by allowing the sintered compact to hold at the temperature of not lower than 600° C. but not higher than 800° C., followed by cooling to room temperature. Thus, a hard brittle γ phase (delta phase) is inhibited from precipitating in grain boundaries and the like. Thereby, it is possible to enhance the mechanical strength, inclusive of the fatigue strength, of the Ni alloy part.

The foregoing configuration includes the aging treatment step of aging-treating the sintered compact by allowing the sintered compact to hold at the temperature of not lower than 600° C. but not higher than 800° C., followed by cooling to room temperature, where the sintered compact is molded from a precipitation hardening Ni alloy powder by metal injection molding with sintering at a temperature of not lower than 1100° C. but not higher than 1250° C. for one hour to five hours, followed by rapidly cooling to room temperature, and where the precipitation hardening Ni alloy powder includes Ti of 0.65% by mass to 1.15% by mass, inclusive, Al of 0.20% by mass to 0.80% by mass, inclusive, Cr of 17.00% by mass to 21.00% by mass, inclusive, Nb of 4.75% by mass to 5.50% by mass, inclusive, Mo of 2.80% by mass to 3.30% by mass, inclusive, Ni of 50.00% by mass to 55.00% by mass, inclusive, and the balance including Fe and the unavoidable impurities. Since the sintering process in the metal injection molding also has a function as the solution treatment, it is possible to inhibit the hard brittle γ phase (delta phase) from precipitating in the grain boundaries and the like, and accordingly to enhance the mechanical strength, inclusive of the fatigue strength, of the Ni alloy part.

DESCRIPTION OF EMBODIMENTS

Figure 1:
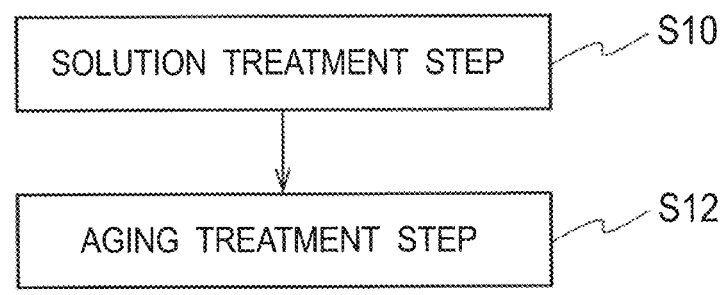
FIG. 1 is a flowchart showing a configuration of a method of manufacturing a Ni alloy part in an embodiment of the present disclosure.

An embodiment of the present disclosure will be described below in detail with reference to the drawings. FIG. 1 is a flowchart showing a configuration of a method of manufacturing a Ni alloy part. The method of manufacturing the Ni alloy part includes a solution treatment step (S10) and an aging treatment step (S12).

The solution treatment step (S10) is a step of solution treating a sintered compact, which is obtained by sintering and molding precipitation hardening Ni alloy powder by metal injection molding, by allowing the sintered compact to hold at a temperature of not lower than 1050° C. but not higher than 1250° C. for one hour to five hours, followed by rapid cooling to room temperature.

To begin with, descriptions will be provided for the metal injection molding (MIM). The metal injection molding includes a kneading process, an injection molding process, a debinding process and a sintering process.

In the kneading process, the precipitation hardening Ni alloy powder is mixed with a binder made from thermoplastic resin and wax by a kneader to produce a kneaded body.

Ni alloy powder corresponding to Alloy 718 (Registered Trademark), which is a precipitation hardening Ni alloy with excellent heat resistance, is used as the precipitation hardening Ni alloy powder. The composition of the precipitation hardening Ni alloy powder includes Ti (titanium) of 0.65% by mass to 1.15% by mass, inclusive; Al (aluminum) of 0.20% by mass to 0.80% by mass, inclusive; Cr (chromium) of 17.00% by mass to 21.00% by mass, inclusive; Nb (niobium) of 4.75% by mass to 5.50% by mass, inclusive; Mo (molybdenum) of 2.80% by mass to 3.30% by mass, inclusive; Ni (nickel) of 50.00% by mass to 55.00% by mass, inclusive; and the balance including Fe (iron) and unavoidable impurities. Incidentally, B (boron), Si (silicon), P (phosphorus), Mn (manganese), Co (cobalt), Ta (tantalum), Cu (copper), Pt (lead), Bi (bismuth), Se (selenium), O (oxygen), C (carbon) or N (nitrogen) may be included as the unavoidable impurities.

Ti, which is an alloy component, is an element to form a γ' phase (gamma prime phase). The γ' phase (gamma prime phase) is formed from an intermetallic compound mainly based on $Ni_3(Al,Ti)$. Al is an element to form the γ' phase (gamma prime phase), and to enhance resistance against oxidation by forming an aluminum oxide such as an alumina. Cr is an element to enhance resistance against oxidation and resistance against corrosion by forming an oxide of chromium such as a chromium oxide. Nb is an element to form a γ" phase (gamma double prime phase). The γ" phase (gamma double prime phase) is formed from an intermetallic compound mainly based on $Ni_3Nb$. Mo is an element to be solid-solved into a γ phase (gamma phase), which is a Ni matrix phase, for solid solution strengthening, and to enhance resistance against corrosion. Fe is an element to be solid-solved into the γ phase (gamma phase), which is the Ni matrix phase, for solid solution strengthening. Ni is an element to form the γ phase (gamma phase) which is the Ni matrix phase, the γ' phase (gamma prime phase) and the γ" phase (gamma double prime phase). When the contents of these alloy components respectively fall within their above-mentioned composition ranges, it is possible to obtain a heat-resistant and corrosion-resistant precipitation hardening Ni alloy.

The average particle diameter of the precipitation hardening Ni alloy powder may be less than 35 μm. The use of the precipitation hardening Ni alloy powder whose average particle diameter is less than a usual one as above makes it possible to obtain the sintered compact whose density and particle diameter are almost equal to those of forged material. Here, the average particle diameter means, for example, a particle size (median diameter) obtained by using a particle size distribution of the particles measured by a laser diffraction/scattering method, and finding the middle value of the particle size distribution observations arranged from the smallest particle size. The precipitation hardening Ni alloy powder may be gas-atomized powder, water-atomized powder or the like. Nevertheless, the gas-atomized powder may be used rather than the water-atomized powder, because oxygen concentration is lower in the gas-atomized powder than in the water-atomized powder.

The binder may be made from a thermoplastic resin such as a polystyrene resin or a polymethyl methacrylate resin and a wax such as a paraffin wax. The precipitation hardening Ni alloy powder and the binder are kneaded by the kneader into the kneaded body.

In the injection molding process, an injection molding machine injects the kneaded body into a molding die while pressing the kneaded body, and thus produces a preliminary green body. The injection molding machine to be used may be the same as that used to produce synthetic-resin parts, or to do a similar thing.

In the debinding process, the preliminary green body is taken out of the molding die, and the binder components are removed from the preliminary green body by using a solvent, or by heating the preliminary green body. For example, the debinding may be achieved by placing the preliminary green body in a debinding furnace, and heating the preliminary green body in an inert atmosphere of an argon gas or the like.

In the sintering process, the sintered compact is formed by heating and sintering the preliminary green body in a vacuum atmosphere, or in an inert atmosphere of an argon gas or the like. Conditions for the sintering include a sintering temperature of 1100° C. to 1300° C., and a sintering time of one hour to five hours, for example. The sintering may be performed at a sintering temperature close to a melting point of the precipitation hardening Ni alloy for the purpose of densifying the sintered compact. The cooling following the sintering may be achieved by cooling the sintered compact to room temperature in the furnace, or by rapidly cooling the sintered compact to room temperature with air, water or the like. The sintering process may use a sintering furnace for usual metallic materials. With this, it is possible to obtain the sintered compact which is molded from the precipitation hardening Ni alloy powder by metal injection molding.

Next, descriptions will be provided for how to solution treat the sintered compact which is molded from the precipitation hardening Ni alloy powder by metal injection molding. In the solution treatment, the sintered compact is allowed to hold at the temperature of not lower than 1050° C. but not higher than 1250° C. for one hour to five hours, followed by rapid cooling to room temperature. The purpose of the solution treatment is to solid-solve the alloy components such as Al, Ti and Nb, forming the γ' phase (gamma prime phase) and the γ" phase (gamma double prime phase), into the γ phase (gamma phase) which is the Ni matrix phase in order to finely precipitate the γ' phase (gamma prime phase) mainly based on $Ni_3(Al,Ti)$ and the γ" phase (gamma double prime phase) mainly based on $Ni_3Nb$ into the γ phase (gamma phase) which is the Ni matrix phase in the aging treatment (later described).

The reason why the solution treatment temperature is not lower than 1050° C. is that if the temperature is less than 1050° C., a hard brittle γ phase (delta phase) mainly based on $Ni_3Nb$ precipitates in grain boundaries and the like. Incidentally, the crystal structure of the γ" phase (gamma double prime phase) is tetragonal, while the crystal structure of the δ phase (delta phase) is orthorhombic.

The reason why the solution treatment temperature is not higher than 1250° C. is that if the temperature is higher than 1250° C., crystal grains grow large and coarsen to decrease the mechanical strength.

The solution treatment temperature may be not lower than 1100° C. but not higher than 1250° C. This is because the setting of the solution treatment temperature at 1100° C. or greater makes it possible to inhibit the precipitation of the δ phase (delta phase).

The reason that the time length for which the sintered compact holds at the solution treatment temperature is one hour to five hours is that if the time length is less than one hour, the alloy components such as Al, Ti and Nb may not be sufficiently solid-solved into the γ phase (gamma phase) which is the Ni matrix phase, and if the time length is longer than five hours, crystal grains may grow large and coarsen.

The purpose of the rapid cooling from the solution treatment temperature to room temperature is to supersaturate the alloy components such as Al, Ti and Nb at room temperature. The cooling from the solution treatment temperature may be achieved as rapid cooling at a cooling rate equal to or higher than that of air cooling. The rapid cooling may be performed by gas fan cooling, water cooling, or the like.

The solution treatment may be performed in a vacuum atmosphere, or in an inert atmosphere using an inert gas such as an argon gas. The solution treatment may use a heat treatment furnace, such as a solution treatment furnace, for usual metallic materials.

The aging process (S12) is a step of aging-treating the solution-treated sintered compact by allowing the solution-treated sintered compact to hold at a temperature of not lower than 600° C. but not higher than 800° C., followed by cooling to room temperature.

The reason why the aging treatment temperature is not lower than 600° C. but not higher than 800° C. is that when the aging treatment temperature falls within the temperature range, the γ' phase (gamma prime phase) and the γ" phase (gamma double prime phase) can be finely precipitated into the γ phase (gamma phase) which is the Ni matrix phase, and the precipitation of the δ phase (delta phase) can be inhibited. Since the γ" phase (gamma double prime phase) is a metastable phase, the heat treatment of the γ" phase (gamma double prime phase) at high temperature transforms its phase into the stable δ phase (delta phase). For this reason, the setting of the aging treatment temperature at not lower than 600° C. but not higher than 800° C. inhibits the phase transformation from the γ" phase (gamma double prime phase) into the δ phase (delta phase). The time length for which the solution-treated sintered compact holds at the aging treatment temperature may be 5 hours to 30 hours. The cooling from the aging treatment temperature to room temperature is performed, for example, by air cooling, gas fan cooling, or the like.

The aging treatment may be performed by two steps. In a possible two-step aging treatment, the solution-treated sintered compact is allowed to hold at a temperature of 718° C. to 760° C. for 8 hours to 10 hours in the first step of the aging treatment, followed by cooling to a temperature of 621° C. to 649° C. in the furnace, and then is allowed to hold at 621° C. to 649° C. for 8 hours to 20 hours, followed by cooling to room temperature by gas fan cooling or the like. In the two-step aging treatment, for example, the solution-treated sintered compact is allowed to hold at 718° C. for 8 hours, followed by cooling to a temperature of 621° C. in the furnace, and then is allowed to hold at 621° C. for 8 hours, followed by cooling to room temperature by gas fan cooling.

The aging treatment may be performed in a vacuum atmosphere, or in an inert atmosphere using an inert gas such as an argon gas. The aging treatment may use a heat treatment furnace, such as an aging treatment furnace, for usual metallic materials.

In the thus-produced Ni alloy part, the γ' phase (gamma prime phase) and the γ" phase (gamma double prime phase) are finely and dispersedly precipitated into the γ phase (gamma phase) which is the Ni matrix phase, the hard brittle δ phase (delta phase), which decreases the ductility, toughness and the like, is inhibited from precipitating in the grain boundaries and the like, and the crystal grains are inhibited from coarsening due to the growth of the crystal grains. Thereby, it is possible to enhance the mechanical strength, inclusive of tensile strength and fatigue strength, of the Ni alloy part.

It should be noted that the above-configured solution treatment inhibits the precipitation of the hard brittle δ phase (delta phase) and the coarsening of the crystal grains by allowing the sintered compact, which is molded from the precipitation hardening Ni alloy powder by metal injection molding, to hold at the temperature of 1050° C. to 1250° C. for one hour to five hours, followed by rapid cooling to room temperature. Meanwhile, the forged material is given an enhanced mechanical strength by applying strain to the forged material and thereby micronizing the crystal grains. For this reason, if the forged material is solution treated at such a high temperature, the crystal grains coarsen through recovery and recrystallization, and the mechanical strength of the forged material thus decreases. In contrast to this, the metal injection molding can micronize the crystal grains without applying strain to the sintered compact, since the sintered compact is obtained by sintering and molding the metal powder with a smaller particle diameter. Accordingly, the forgoing configuration makes it possible to inhibit the coarsening of the crystal grains and the decrease in the mechanical strength, even though the solution treatment is performed at the high temperature of not lower than 1100° C. but not higher than 1250° C.

Furthermore, in the case where in the sintering process for the metal injection molding, the sintered compact is molded by being allowed to hold at the temperature of not lower than 1100° C. but not higher than 1250° C. for one hour to five hours, followed by rapid cooling to room temperature, the solution treatment step (S10) may be omitted. This is because the sintering process also has a function of the solution treatment in the solution treatment step (S10). The aging treatment following the sintering process is the same as the aging treatment step (S12) described above. For this reason, the detailed descriptions for it will be omitted.

Figure 2:
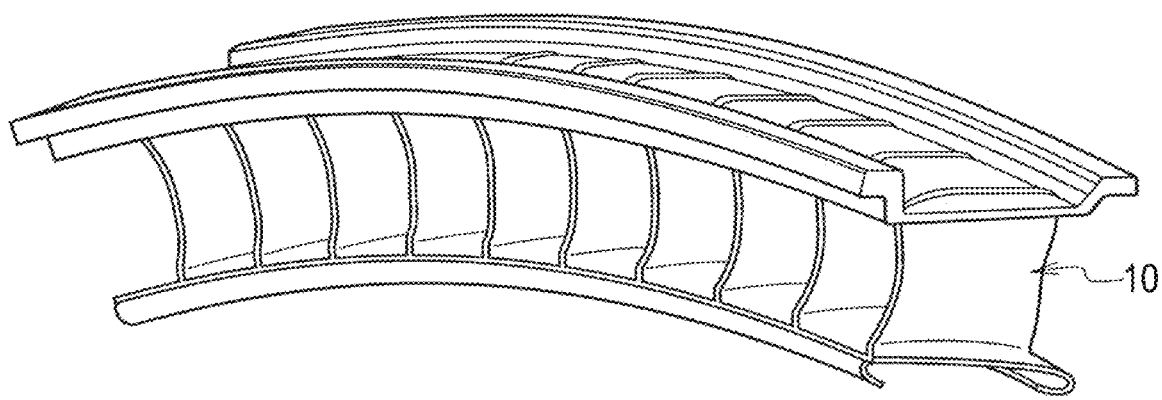
FIG. 2 is a diagram showing a configuration of the Ni alloy part applicable to a gas turbine in the embodiment of the present disclosure.

FIG. 2 is a diagram showing a configuration of a Ni alloy part 10 applicable to a gas turbine. The Ni alloy part 10 shown in FIG. 2 is a compressor blade which is a gas turbine part. The compressor blade has mainly a thin three-dimensional blade surface in order to satisfy a need for enhancing aerodynamic performance, and thus has a complicated assembling process. Because the compressor blade is a part constituting the air passage, the compressor blade has sufficient mechanical strength, such as fatigue strength, against vibrations. Therefore, the compressor blade is manufactured by molding the sintered compact from the precipitation hardening Ni alloy powder corresponding to ALLOY 718 (Registered Trademark) by metal injection molding, and applying the solution treatment step (S10) and the aging treatment step (S12) to the sintered compact. Thereby, the compressor blade with the enhanced mechanical strength characteristics including a fatigue strength can be manufactured at low costs.

The foregoing configuration includes the solution treatment step of solution treating the sintered compact, which is obtained by sintering and molding the precipitation hardening Ni alloy powder by metal injection molding, by allowing the sintered compact to hold at the temperature of not lower than 1050° C. but not higher than 1250° C. for one hour to five hours, followed by rapid cooling to room temperature, where the precipitation hardening Ni alloy powder includes Ti of 0.65% by mass to 1.15% by mass, inclusive, Al of 0.20% by mass to 0.80% by mass, inclusive, Cr of 17.00% by mass to 21.00% by mass, inclusive, Nb of 4.75% by mass to 5.50% by mass, inclusive, Mo of 2.80% by mass to 3.30% by mass, inclusive, Ni of 50.00% by mass to 55.00% by mass, inclusive, and the balance including Fe and the unavoidable impurities, and the aging treatment step of aging-treating the solution-treated sintered compact by allowing the sintered compact to hold at the temperature of not lower than 600° C. but not higher than 800° C., followed by cooling to room temperature. Thus, the γ' phase (gamma prime phase) mainly based on $Ni_3$ (Al,Ti) and the γ" phase (gamma double prime phase) mainly based on $Ni_3Nb$ are finely and dispersedly precipitated into the γ phase (gamma phase) which is the Ni matrix phase, the hard brittle δ phase (delta phase), which decreases the mechanical strength, is inhibited from precipitating in the grain boundaries and the like, and the crystal grains are inhibited from coarsening due to the growth of the crystal grains. Thereby, it is possible to enhance the mechanical strength, inclusive of the fatigue strength, of the Ni alloy part.

The foregoing configuration includes the aging treatment step of aging-treating the sintered compact by allowing the sintered compact to hold at the temperature of not lower than 600° C. but not higher than 800° C., followed by cooling to room temperature, where the sintered compact is molded from the precipitation hardening Ni alloy powder by metal injection molding with sintering at the temperature of not lower than 1100° C. but not higher than 1250° C. for one hour to five hours, followed by rapidly cooling to room temperature, and where the precipitation hardening Ni alloy powder includes Ti of 0.65% by mass to 1.15% by mass, inclusive, Al of 0.20% by mass to 0.80% by mass, inclusive, Cr of 17.00% by mass to 21.00% by mass, inclusive, Nb of 4.75% by mass to 5.50% by mass, inclusive, Mo of 2.80% by mass to 3.30% by mass, inclusive, Ni of 50.00% by mass to 55.00% by mass, inclusive, and the balance including Fe and the unavoidable impurities. Thus, the γ' phase (gamma prime phase) and the γ" phase (gamma double prime phase) are finely and dispersedly precipitated into the γ phase (gamma phase) which is the Ni matrix phase. The hard brittle δ phase (delta phase) which decreases the mechanical strength is inhibited from precipitating in the grain boundaries and the like. The crystal grains are inhibited from coarsening due to the growth of the crystal grains. Thereby, it is possible to enhance the mechanical strength, inclusive of the fatigue strength, of the Ni alloy part. In addition, the sintering process in the metal injection molding also has a function as the solution treatment. This makes it possible to omit the solution treatment, and accordingly to reduce manufacturing costs.

EXAMPLE

Test pieces produced by heat-treating sintered compacts molded from precipitation hardening Ni alloy powder by metal injection molding were observed in terms of metallographic structure, and were evaluated in terms of fatigue characteristics.

(Metal Injection Molding)

Sintered compacts were molded from precipitation hardening Ni alloy powder by metal injection molding. Some sintered compacts were molded for the purpose of the metallographic structure observation, and the other sintered compacts were molded for the purpose of the fatigue test. Powder of Alloy 718 (Registered Trademark) was used as the precipitation hardening Ni alloy powder. The alloy composition of the precipitation hardening Ni alloy powder included Cr with a content of 20.40% by mass, Fe with a content of 16.40% by mass, Mo with a content of 3.10% by mass, Nb with a content of 5.20% by mass, Ti with a content of 1.00% by mass, Al with a content of 0.50% by mass, and the balance including Ni, and unavoidable impurities such as C with a content of 0.05% by mass. As the precipitation hardening Ni alloy powder, gas-atomized powder with an average particle diameter of less than 35 μm was used.

The precipitation hardening Ni alloy powder was kneaded with a binder including thermoplastic resin and wax using a kneader to produce kneaded bodies. Thereafter, each kneaded body was injected by an injection molding machine into a molding die to produce a preliminary green body. Subsequently, the preliminary green body was taken out of the molding die, and was heated to remove the binder therefrom. After that, the preliminary green body with the binder removed therefrom was placed into an atmosphere furnace, and heated and sintered in an inert atmosphere to produce the sintered compact. The sintering temperature was 1100° C. to 1250° C. The sintering time was one hour to five hours. The cooling from the sintering temperature to room temperature was performed as rapid cooling with air.

(Heat Treatment)

The sintered compacts molded by metal injection molding were heat treated with their respective heat treatment conditions to produce test pieces for Examples 1 to 4 and Comparative Example 1. The respective sintered compacts used for the test pieces were produced with the same molding conditions.

For the test piece of Example 1, the sintered compact was solution treated by being allowed to hold at 1050° C. for one hour, followed by rapid cooling to room temperature by gas fan cooling. Subsequently, the solution-treated sintered compact was aging-treated by being allowed to hold at 718° C. for eight hours, followed by cooling to 621° C. in the furnace, and thereafter being allowed to hold at 621° C. for eight hours, followed by cooling to room temperature by gas fan cooling.

For the test piece of Example 2, the sintered compact was aging-treated by being allowed to hold at 718° C. for eight hours, followed by cooling to 621° C. in the furnace; and thereafter being allowed to hold at 621° C. for eight hours, followed by cooling to room temperature by gas fan cooling. Incidentally, the heat treatment for Example 2 included no solution treatment.

For the test piece of Example 3, the sintered compact was solution treated by being allowed to hold at 1100° C. for one hour, followed by rapid cooling to room temperature by gas fan cooling. Subsequently, the solution-treated sintered compact was aging-treated by being allowed to hold at 718° C. for eight hours, followed by cooling to 621° C. in the furnace; and thereafter being allowed to hold at 621° C. for eight hours, followed by cooling to room temperature by gas fan cooling.

For the test piece of Example 4, the sintered compact was solution treated by being allowed to hold at 1250° C. for five hours, followed by rapid cooling to room temperature by gas fan cooling. Subsequently, the solution-treated sintered compact was aging-treated by being allowed to hold at 718° C. for eight hours, followed by cooling to 621° C. in the furnace, and thereafter being allowed to hold at 621° C. for eight hours, followed by cooling to room temperature by gas fan cooling.

For the test piece of Comparative Example 1, the sintered compact was solution treated by being allowed to hold at 970° C. for one hour, followed by rapid cooling to room temperature by gas fan cooling. Subsequently, the solution-treated sintered compact was aging-treated by being allowed to hold at 718° C. for eight hours, followed by cooling to 621° C. in the furnace, and thereafter being allowed to hold at 621° C. for eight hours, followed by cooling to room temperature by gas fan cooling.

(Metallographic Structure)

Figure 3A:
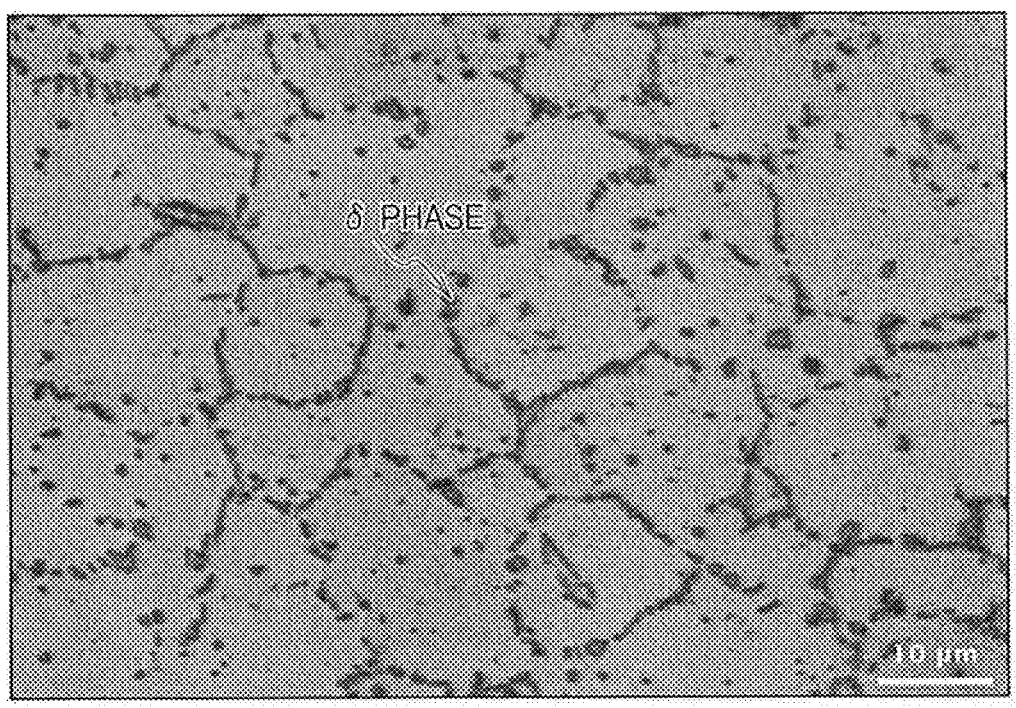
FIG. 3A is a picture showing a result of observing a metallographic structure of a test piece of comparative example 1 in the embodiment of the present disclosure.
Figure 3B:
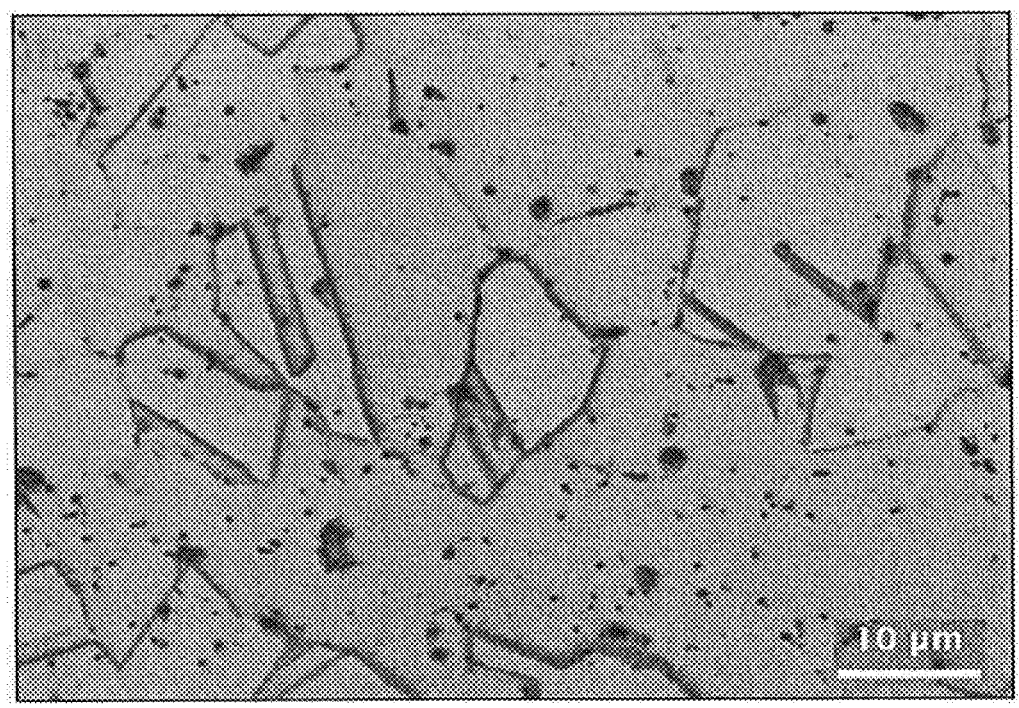
FIG. 3B is a picture showing a result of observing a metallographic structure of a test piece of Example 1 in the embodiment of the present disclosure.
Figure 3C:
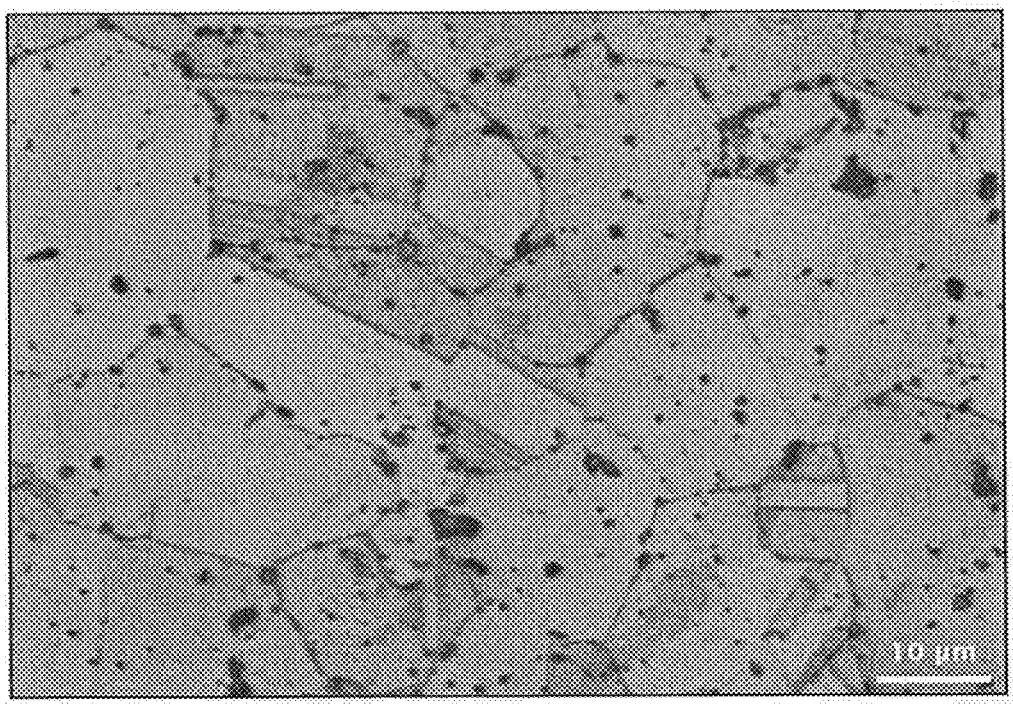
FIG. 3C is a picture showing a result of observing a metallographic structure of a test piece of Example 2 in the embodiment of the present disclosure.
Figure 3D:
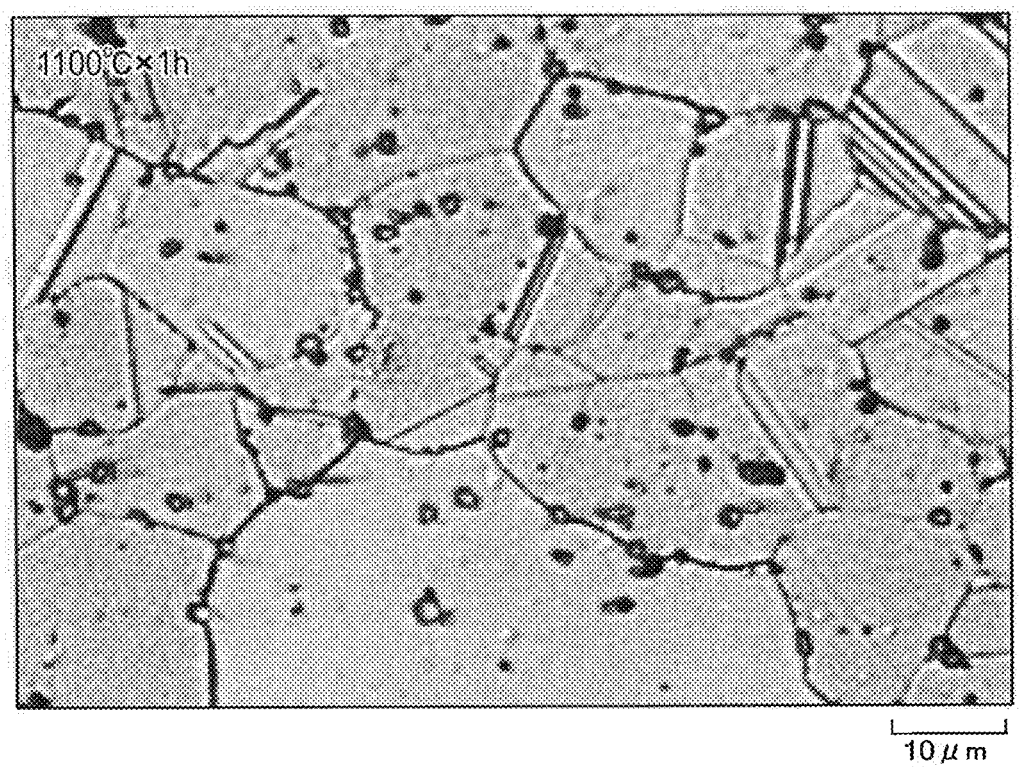
FIG. 3D is a picture showing a result of observing a metallographic structure of a test piece of Example 3 in the embodiment of the present disclosure.
Figure 3E:
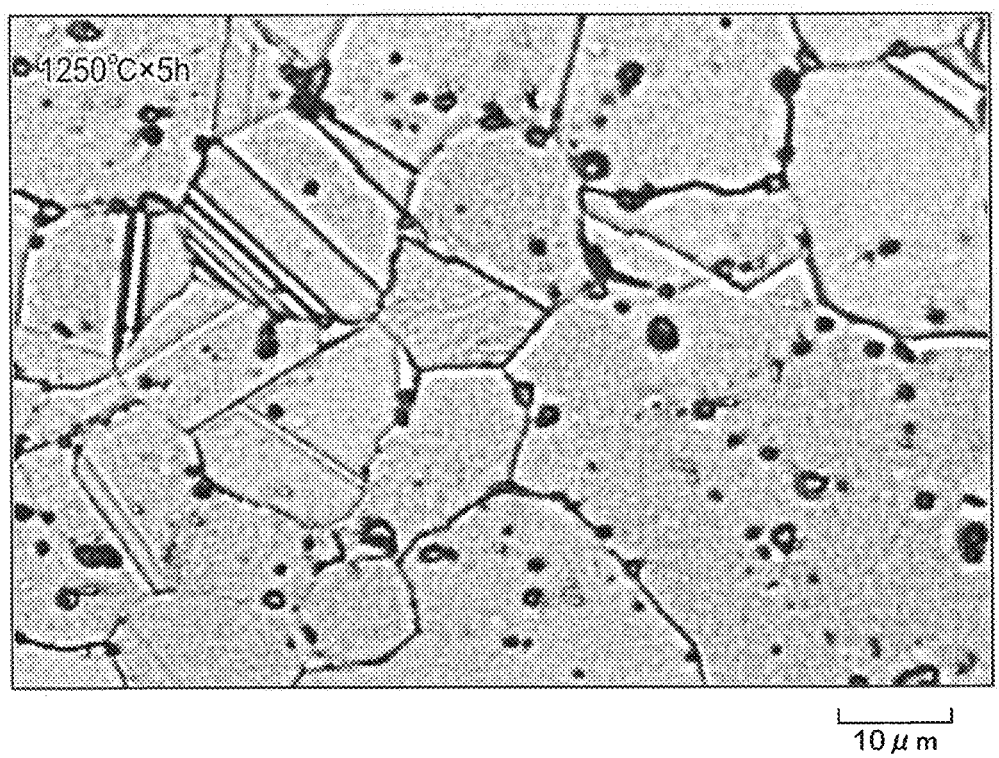
FIG. 3E is a picture showing a result of observing a metallographic structure of a test piece of Example 4 in the embodiment of the present disclosure.

Next, each heat-treated test piece was observed in terms of metallographic structure. For each test piece, the metallographic structure observation was carried out by embedding the test piece in embedding resin, thereafter grinding and etching the test piece, and observing the metallographic structure of the test piece using an optical microscope. FIG. 3A is a picture showing a result of observing the metallographic structure of the test piece of Comparative Example 1. FIG. 3B is a picture showing a result of observing the metallographic structure of the test piece of Example 1. FIG. 3C is a picture showing a result of observing the metallographic structure of the test piece of Example 2. FIG. 3D is a picture showing a result of observing the metallographic structure of the test piece of Example 3. FIG. 3E is a picture showing a result of observing the metallographic structure of the test piece of Example 4.

In the test piece of Comparative Example 1, the precipitation of the δ phase (delta phase) in grain boundaries was observed. In contrast to this, in the test pieces of Examples 1 to 4, the precipitation of the δ phase (delta phase) was not observed, and the growth of crystal grains was inhibited. From these, it was learned that when the solution treatment was achieved by allowing the sintered compact to hold at the temperature of not lower than 1050° C. but higher than 1250° C. for one hour to five hours, followed by rapid cooling to room temperature, the hard brittle δ phase (delta phase) was inhibited from precipitating in the grain boundaries, and the crystal grains were inhibited from coarsening due to the growth of the crystal grains. In addition, it was learned that when the sintered compact was solution treated at a solution treatment temperature less than 1050° C., the δ phase (delta phase) precipitated in the grain boundaries. Moreover, since in the test piece of Example 2, the precipitation of the δ phase (delta phase) was not observed and the crystal grains are inhibited from coarsening due to the growth of the crystal grains, it was learned that the sintering process in the metal injection molding also has a function as the solution treatment.

(Fatigue Test)

The fatigue test was carried out at room temperature and at a higher temperature in accordance with ASTM E466. The room-temperature fatigue test was carried out with a stress ratio of R=−1 (repeated stress under zero mean stress), and with a stress amplitude of 400 MPa to 600 MPa. The high-temperature fatigue test was carried out at a test temperature of 538° C., with a stress ratio of R=−1 (repeated stress under zero mean stress), and with a stress amplitude of 500 MPa to 600 MPa. The room-temperature fatigue test was performed on the test pieces of Comparative Example 1 and Example 2, while high-temperature fatigue test was performed on the test pieces of Examples 1 and 2. Furthermore, in a case where no fatigue fracture occurred when the number of cycles reached 1×10⁷, the test on the test piece was terminated at that moment.

Figure 4:
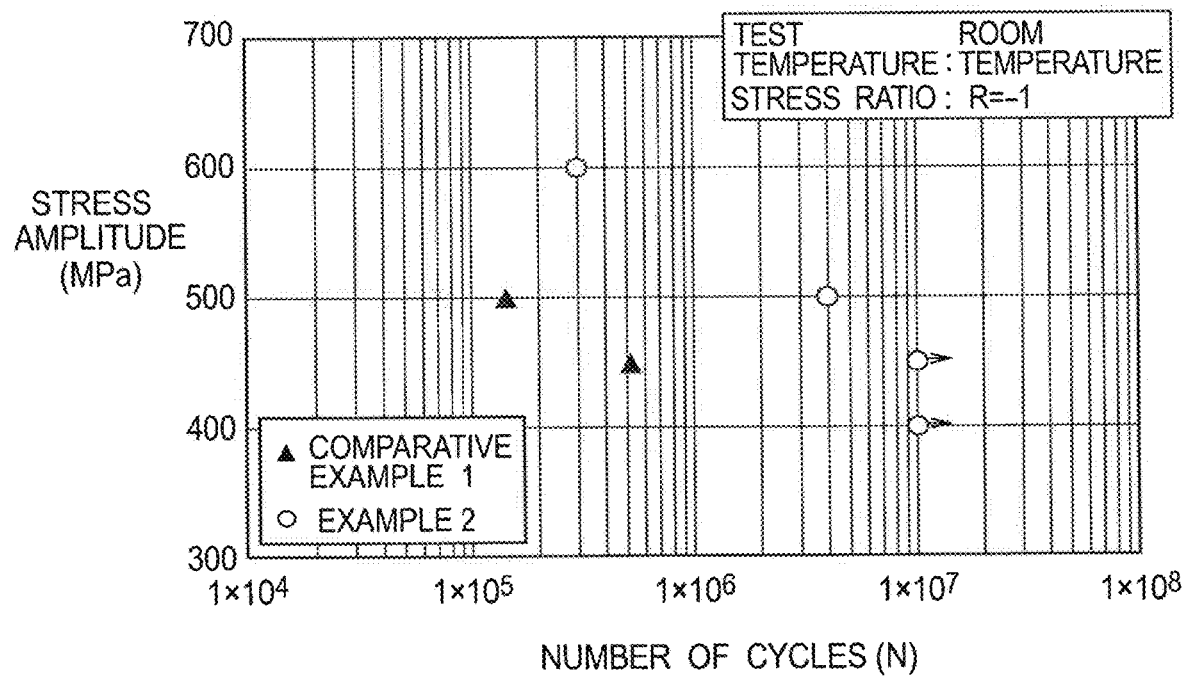
FIG. 4 is a graph showing a result of a room-temperature fatigue test in the embodiment of the present disclosure.

FIG. 4 is a graph showing a result of the room-temperature fatigue test. In FIG. 4, the horizontal axis represents the number of cycles, the vertical axis represents the stress amplitude, a result of the test on the test piece of Example 2 is shown with white circles, and a result of the test on the test piece of Comparative Example 1 is shown with black triangles. Each white circle with an arrow means that no fatigue fracture occurred when the number of cycle reached 1×10⁷. It was learned that the fatigue characteristic of the test piece of Example 2 was enhanced compared with the fatigue characteristic of the test piece of Comparative Example 1. One may consider that the reason for this was that no δ phase (delta phase) was precipitated in the test piece of Example 2 while the δ phase (delta phase) precipitated in the grain boundaries in the test piece of Comparative Example 1 and decreased its fatigue characteristic.

Figure 5:
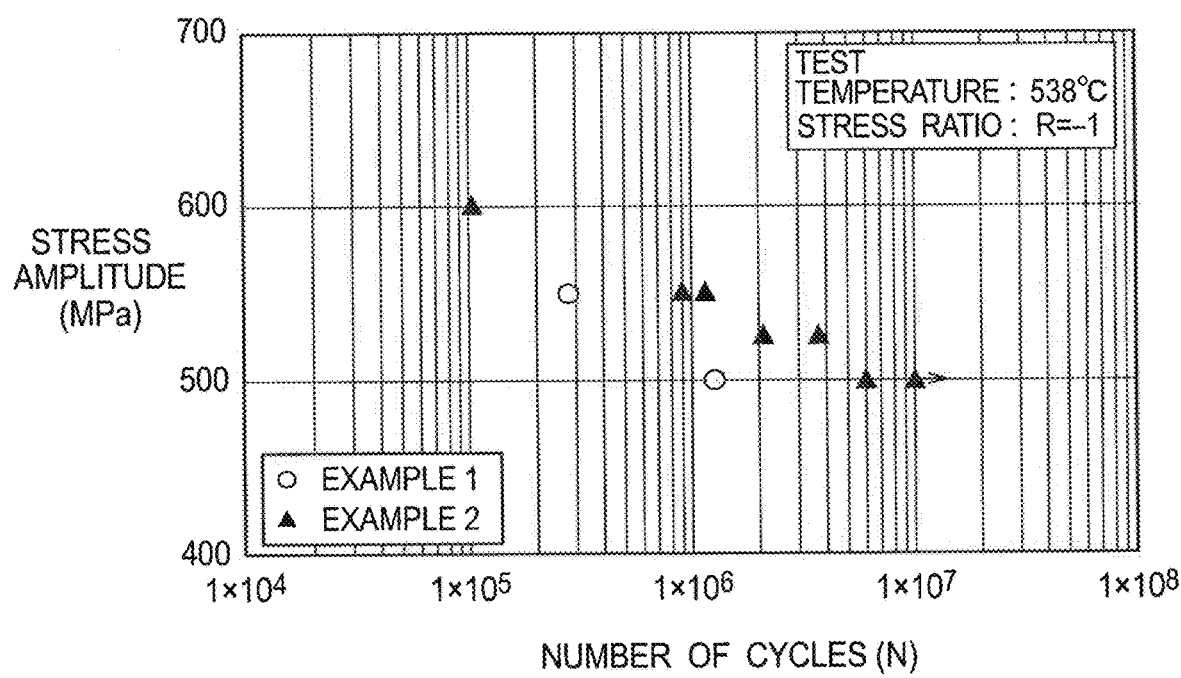
FIG. 5 is a graph showing a result of a high-temperature fatigue test in the embodiment of the present disclosure.

FIG. 5 is a graph showing a result of the high-temperature fatigue test. In FIG. 5, the horizontal axis represents the number of cycles, the vertical axis represents the stress amplitude, a result of the test on the test piece of Example 1 is shown with white circles, and a result of the test on the test piece of Example 2 is shown with black triangles. A black triangle with an arrow means that no fatigue fracture occurred when the number of cycle reached 1×10⁷. A high fatigue characteristic was obtained from the test pieces of Examples 1 and 2. One may consider that the reason for this was that no δ phase (delta phase) was precipitated in the test piece of Example 1 or the test piece of Example 2. Moreover, it was learned that the fatigue characteristic of the test piece of Example 2 was enhanced compared with the fatigue characteristic of the test piece of Example 1. One may consider that the reason for this was that the sintering temperature for the test piece of Example 2 which corresponded to the solution treatment temperature was higher than the solution treatment temperature for the test piece of Example 1.

The above-configured method of manufacturing a Ni alloy part is capable of enhancing the mechanical strength, inclusive of the fatigue strength, of the Ni alloy part, and is therefore applicable to a compressor blade of a gas turbine, and the like.

What is claimed is:

1. A method of manufacturing a Ni alloy part comprising an aging treatment step of aging-treating a sintered compact, followed by cooling to room temperature without performing a solution treatment,
   wherein the sintered compact is molded from a precipitation hardening Ni alloy powder by metal injection molding with sintering at a temperature of not lower than 1100° C. but not higher than 1250° C. for one hour to five hours, followed by cooling to room temperature at cooling rate equal to or higher than a cooling rate of air cooling without precipitating a δ phase,
   wherein the precipitation hardening Ni alloy powder comprises Ti of 0.65% by mass to 1.15% by mass, inclusive, Al of 0.20% by mass to 0.80% by mass, inclusive, Cr of 17.00% by mass to 21.00% by mass, inclusive, Nb of 4.75% by mass to 5.50% by mass, inclusive, Mo of 2.80% by mass to 3.30% by mass, inclusive, Ni of 50.00% by mass to 55.00% by mass, inclusive, and the balance including Fe and unavoidable impurities, and
   wherein, in the aging treatment step, the sintered compact is allowed to hold at a temperature of 718° C. to 760° C., and then is allowed to hold at 621° C. to 649° C. in a two-step aging treatment without precipitating a δ phase.

2. The method of manufacturing a Ni alloy part according to claim 1, wherein the Ni alloy part is a gas turbine part.

3. The method of manufacturing a Ni alloy part according to claim 1, wherein the sintering is performed within an inert atmosphere.

4. The method of manufacturing a Ni alloy part according to claim 2, wherein the gas turbine part is a compressor blade.

* * * * *